US006476093B1

(12) United States Patent
Araki et al.

(10) Patent No.: US 6,476,093 B1
(45) Date of Patent: Nov. 5, 2002

(54) FROSTING COMPOSITION AND FROSTED GLASS CONTAINER

(75) Inventors: Eiichi Araki, Himeji (JP); Norihiro Sugihara, Himeji (JP); Hiroshi Manabe, Himeji (JP); Yoshikazu Kuroda, Nishinomiya (JP); Motofumi Fukunami, Nishinomiya (JP)

(73) Assignees: Sumitomo Seiki Chemicals Co., Ltd., Hyogo (JP); Nihon Yamamura Glass Co., Ltd., Hyogo (JP)

( * ) Notice: Subject to any disclaimer, the term of this patent is extended or adjusted under 35 U.S.C. 154(b) by 0 days.

(21) Appl. No.: 09/485,671

(22) PCT Filed: Aug. 12, 1998

(86) PCT No.: PCT/JP98/03593

§ 371 (c)(1),
(2), (4) Date: Feb. 25, 2000

(87) PCT Pub. No.: WO99/10437

PCT Pub. Date: Mar. 4, 1999

(30) Foreign Application Priority Data

Aug. 27, 1997 (JP) .................................................. 230832
Jan. 27, 1998 (JP) .................................................. 013852

(51) Int. Cl.[7] ............................ C08F 2/48; C04B 14/04
(52) U.S. Cl. ............................ 522/83; 522/74; 522/75; 522/77; 522/79; 522/80; 522/96; 522/97; 522/104; 522/120; 522/100; 522/121; 522/122; 522/182; 522/107; 106/400; 106/401; 106/482; 106/490; 106/499; 106/491; 427/508; 427/512; 427/518; 428/35.7; 428/36.92; 252/600

(58) Field of Search .............................. 522/74, 75, 77, 522/79, 80, 83, 96, 97, 120, 121, 122, 100, 104, 107, 182; 524/858, 860, 265; 523/521; 252/600; 106/400, 401, 482, 490, 491, 499; 428/35.7, 36.92; 427/508, 512, 518

(56) References Cited

FOREIGN PATENT DOCUMENTS

| EP | 0213737 A1 | 3/1987 |
|---|---|---|
| EP | 0349216 A1 | 1/1990 |
| EP | 0736585 A1 | 10/1996 |
| JP | 59-204669 | * 11/1984 |
| JP | 3-220268 A | 9/1991 |
| JP | 5-068418 B2 | 9/1993 |
| JP | 9-157545 A | 6/1997 |
| JP | 9-286929 A | 11/1997 |

* cited by examiner

*Primary Examiner*—James J. Seidleck
*Assistant Examiner*—Sanza L. McClendon
(74) *Attorney, Agent, or Firm*—Jones, Tullar & Cooper, PC

(57) ABSTRACT

There are disclosed a frost-coating composition, which comprises (i) a hydrophobic silica particle or further comprises (ii) a polymer particle, in addition to a photocurable compound; and a frosted glass container coated with such a composition. The frosted glass container coated with such a composition is excellent in alkali resistance, or excellent both in alkali resistance and in impact resistance.

22 Claims, No Drawings

FROSTING COMPOSITION AND FROSTED GLASS CONTAINER

FIELD OF THE INVENTION

The present invention relates to a frost-coating composition. More specifically, the present invention relates to a frost-coating composition which forms on a glass container a frosted coating having excellent alkali-washing resistance, further, relates to a frost-coating composition which forms on a glass container a frosted coating having not only excellent alkali-washing resistance but also excellent impact resistance. Herein, glass containers involve glass bottles, glassware such as cups and dishes, and vases.

BACKGROUND OF THE INVENTION

A glass container with a frostily finished surface, so-called "a frosted glass container" is extensively used as a container for foods, beverages, alcoholic liquors, cosmetics and others because it prevents UV transmission and improves a design to impart an impression of high quality to the container. Generally, in order to finish a surface of a glass container frosty, a method is used in which the surface is etched with a hydrofluoric acid solution with added salts such as ammonium fluoride, or a mixed solution of hydrofluoric acid and sulfuric acid with added salts such as ammonium fluoride. Although this method provides a fine frosted surface, the use of a strong acid, such as hydrofluoric acid as an etching agent, makes the handling of agents difficult and requires many steps of washing with an acid and water. Thus, there are problems such as treatment of acidic waste water and others in respect of safety, environments, productivity, costs and the like. As a method for finishing a surface of a glass container frosty without using such harmful agents, a method of mixing a fine silica particle as a matting agent into a thermosetting resin or a photocurable resin to form a frosted coating on the surface of the glass container is disclosed in JP-A 2518/1978 and JP-B 68418/1993.

However, when a frosted glass container is immersed into a washing solution such as an aqueous sodium hydroxide solution in a step of alkali washing, such a frosted coating obtained by the above method has significant and practical problems that the coating turns white and, sometimes, peels from the container.

In addition, when a glass container passes through an alkali washing line or a bottling line, cracking and peeling of the coating sometimes occur by collision between glass bottles. Thus, there has been desired to enhance the impact resistance of the coating.

The present invention was done to solve the above problems in such a coating composition. The first object of the present invention is to provide a coating composition that forms a frosted coating having excellent alkali resistance on a glass container.

The second object of the present invention is to provide a coating composition that forms a frosted coating having excellent impact resistance as well as excellent alkali resistance on a glass container.

Further, the object of the present invention is to provide a frosted glass container coated with such a coating composition.

DISCLOSURE OF THE INVENTION

The present inventors considered that the prior art frosted coatings were affected to be whitened and the like in a step of alkali washing due to poor alkali resistance of a fine silica particle incorporated as a matting agent. Thus, we made every effort to study on kinds and natures of matting agents. Consequently, we found that the alkali resistance of a frosted coating could be significantly improved by using a hydrophobic fine silica particle as a matting agent and that the impact resistance could be significantly improved by using, as a matting agent, a hydrophobic fine silica particle having excellent alkali resistance and at the same time by further using a fine polymer particle within the range where the alkali resistance was not deteriorated, which resulted in the completion of the present invention.

That is, in the first aspect, the present invention provides a frost-coating composition comprising 5–50 parts by weight of a hydrophobic fine silica particle based on 100 parts by weight of a photocurable compound.

In the first aspect of the present invention, a frosted coating having excellent alkali resistance can be formed by mixing a photocurable compound and a hydrophobic fine silica particle without using any strong acid as an etching agent.

In addition, in the second aspect, the present invention provides a frost-coating composition comprising 5–50 parts by weight of a hydrophobic fine silica particle and 3–30 parts by weight of a fine polymer particle based on 100 parts by weight of a photocurable compound.

In the second aspect of the present invention, the properties of excellent impact resistance due to a fine polymer particle can be manifested besides the properties of excellent alkali resistance possessed by the above frosted coating formed by mixing a photocurable compound and a hydrophobic fine silica particle. Thus, it is considered that a synergistic effect is obtained without impeding the characteristics each other.

According to the second aspect of the present invention, a coating composition can be provided, which forms a frosted coating having excellent impact resistance as well as excellent alkali resistance on a glass container.

DETAILED DESCRIPTION OF THE INVENTION

The fist aspect and the second aspect of the present invention will be successively described in details below.

[The First Aspect]

A photocurable compound used in the first aspect of the present invention is not limited to specified ones but may be any compound which is cured by irradiation of an active energy ray such as visible light or UV light to give a conventional resin used for plastic-coating of a glass container. As the above photocurable compound, there are, for example, mainly a reactive compound having two or more (meth)acryloyl groups in the molecule, and a compound containing, as needed, a monofunctional monomer containing one (meth)acryloyl group in the molecule (hereinafter, referred to as "diluting monomer"). Additionally, "(meth) acryl" means herein both "acryl" and "methacryl".

The weight proportion of the reactive compound in the photocurable compound used in the first aspect of the present invention may be 100%, but is usually 95–5% and, preferably 90–10% from a viewpoint of the toughness of the cured resin coating and the curability of the coating.

As the above reactive compound, there are, for example, (1) polyhydric (meth)acrylates resulting from bonding of two or more (meth)acrylic acids to polyhydric alcohols, (2) polyester (meth)acrylates resulting from bonding of two or more (meth)acrylic acids to polyester polyols obtained by the reaction of polyhydric alcohols and polybasic acids, (3) epoxy-modified (meth)acrylates obtained by esterifying the epoxy groups of epoxy compounds having two or more epoxy groups in the molecule with (meth)acrylic acids to form (meth)acryloyl groups as a functional group, and (4) polyurethane (meth)acrylates obtained by reacting polyvalent isocyanate compounds with hydroxyl group-containing (meth)acrylates. Among them, polyhydric (meth)acrylates and epoxy-modified (meth)acrylates are preferably used from a viewpoint of the strength of the cured resin coating.

Examples of the above polyhydric (meth)acrylate are not limited to but include diethylene glycol di(meth)acrylate, neopentyl glycol di(meth)acrylate, 1,6-hexanediol di(meth)acrylate, bisphenol A di(meth)acrylate, trimethylolpropane tri(meth)acrylate, dipentaerythritol hexa(meth)acrylate, and compounds represented by the general formula (1):

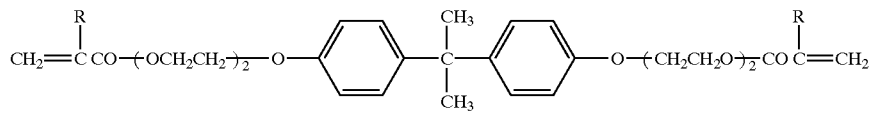

(wherein R represents H, F or $CH_3$).

Examples of the above epoxy-modified (meth)acrylate are not limited to but include bisphenol A epoxy-modified (meth)acrylate, glycerol diglycidyl ether-modified (meth)acrylate, neopentyl glycol diglycidyl ether-modified (meth)acrylate and ethylene glycol diglycidyl ether-modified (meth)acrylate.

As the above diluting monomer, there are, for example, 2-hydroxypropyl (meth)acrylate, dicyclopentenyloxyethyl (meth)acrylate, tetrahydrofurfuryl (meth)acrylate and isobornyl (meth)acrylate.

In order to control the viscosity, reactivity and hardness after curing of the photocurable compound, these are used together with the above reactive compound as needed.

In the first aspect of the present invention, the hydrophobic fine silica particle used as a matting agent is not limited to specified ones but, for example, a hydrophilic fine silica particle which is hydrophobization-treated with a hydrophobic compound is used. More particularly, there are a fine particle obtained by coating the surface of a hydrophilic fine silica particle with a hydrophobic compound, and a fine particle obtained by chemically binding a hydrophobic compound having hydrophobic groups in the molecule to silanol groups on the surface of a fine silica particle.

A method for hydrophobization-treating a hydrophilic fine silica particle is not particularly limited, and methods known in the art may be performed, such as a method of immersing a hydrophilic fine silica particle into a solution of a hydrophobic compound, subsequently drying and heat-treating, a method of spraying a solution of a hydrophobic compound while stirring powder of hydrophilic fine silica particles, followed by drying and heat-treating.

As the hydrophilic fine silica particle to be subjected to the hydrophobization-treatment, a conventional hydrophilic fine silica particle such as fused silica, white carbon obtained by a dry or wet process and others can be used.

As the above hydrophobic compound, there are silicone compounds, silane compounds, metallic soap, and wax and, inter alia, silicone compounds and silane compounds are preferably used. As the silicone compound, there is, for example, silicone oil such as methyl hydrogen polysiloxane and modified dimethyl polysiloxanes in which amino groups or epoxy groups are introduced at their side chains or ends.

As the silane compound, there are, for example, chlorosilane compounds such as methyl chlorosilane, phenyl chlorosilane and the like, alkoxysilane compounds such as methyl alkoxysilane, phenyl alkoxysilane, isobutyl alkoxysilane, hexyl alkoxysilane, octyl alkoxysilane, decyl alkoxysilane, dimethyl polysiloxy alkoxysilane and the like, silazane compounds such as hexamethyl disilazane and the like. Preferably, methyl hydrogen polysiloxane, modified dimetyl polysiloxane, hexyl alkoxysilane, dimethyl polysiloxy alkoxysilane and hexamethyl disilazane are used.

The degree of hydrophobicity of the hydrophobic fine silica particle is represented herein as a volume % of methanol (hereinafter, referred to as "M value") at which the fine silica particle starts to disperse in an aqueous methanol solution when the hydrophobization-treated fine silica particle is floated on water, then, methanol is gradually added into the aqueous phase with gently stirring the aqueous phase. In the present invention, it is preferred that the M value possessed by the hydrophobic fine silica particle is 5 or more, more preferably 20 or more and, still more preferably 40 or more. It is not preferable that the value is less than 5 because the degree of hydrophobicity of the fine silica particle is not sufficient, leading to poor alkali resistance.

The mean particle size of the hydrophobic fine silica particle used in the first aspect of the present invention, depending on the thickness of the coating to be coated on a glass container, is usually in the range of 0.1–25 $\mu$m, more preferably in the range of 1–5 $\mu$m from a viewpoint of manifesting good frostiness. When the mean particle size of a fine silica particle is less than 0.1 $\mu$m, since inequalities of the surface (surface roughness) of the coating are so low that the coating becomes more transparent, it is difficult to manifest frostiness even if a large amount of a fine silica particle is used. On the other hand, it is not preferable that the mean particle size is more than 25 $\mu$m, since inequalities of the surface (surface roughness) are conversely so high that the whiteness becomes high, the design is spoiled and the surface is finished to feel rough.

In the frost-coating composition in the first aspect of the present invention, a fine particle other than a fine silica particle may be used together in order to improve frostiness and feeling, and to prevent precipitation of the fine silica particle, as far as the alkali resistance is not adversely affected. As the fine particle other than fine silica particle, for example, a fine inorganic particle such as alumina, aluminium hydroxide, magnesium hydroxide, magnesium oxide, talc, mica and aluminosilicate, and a fine particle in which the surface of the above fine inorganic particle is hydrophobization-treated can be employed.

The frost-coating composition of the first aspect of the present invention is obtained by incorporating 5–50 parts by weight, preferably 10–30 parts by weight of the hydrophobic fine silica particle based on 100 parts by weight of a photocurable compound. When the proportion of the hydrophobic fine silica particle is less than 5 parts by weight, it is difficult to manifest frostiness. In addition, it is not preferable that the proportion is more than 50 parts by weight because the whiteness is so high to spoil the design and the mechanical strength of the coating is deteriorated in some cases such that the coating becomes brittle.

[The Second Aspect]

A photocurable compound used in the second aspect of the present invention is not limited to specified ones but may be any compound which is cured by irradiation of an active energy ray such as visible light or UV light to give a conventional resin used for a plastic-coating of a glass container, as in the first aspect. As the above photocurable compound, there are, for example, mainly a reactive compound having two or more (meth)acryloyl groups in the molecule, and a compound containing, as needed, a monofunctional monomer containing one (meth)acryloyl group in the molecule (hereinafter, referred to as "diluting monomer"). Additionally, "(meth)acryl" means herein both "acryl" and "methacryl".

The weight proportion of the reactive compound in the photocurable compound used in the second aspect of the present invention may be 100%, but is usually 95–5% and, preferably 90–10% from a viewpoint of the toughness of the cured resin coating and the curability of the coating.

As the above reactive compound, there are, for example, (1) polyhydric (meth)acrylates resulting from bonding of two or more (meth)acrylic acids to polyhydric alcohols, (2) polyester (meth)acrylates resulting from bonding of two or more (meth)acrylic acids to polyester polyols obtained by the reaction of polyhydric alcohols and polybasic acids, (3) epoxy-modified (meth)acrylates obtained by esterifying the epoxy groups of epoxy compounds having two or more epoxy groups in the molecule with (meth)acrylic acids to form (meth)acryloyl groups as a functional group, and (4) polyurethane (meth)acrylates obtained by reacting polyvalent isocyanate compounds with hydroxyl group-containing (meth)acrylates. Among them, polyhydric (meth)acrylates and epoxy-modified (meth)acrylates are preferably used from a viewpoint of the strength of the cured resin coating.

Examples of the above polyhydric (meth)acrylate are not limited to but include diethylene glycol di(meth)acrylate, neopentyl glycol di(meth)acrylate, 1,6-hexanediol di(meth) acrylate, bisphenol A di(meth)acrylate, trimethylolpropane tri(meth)acrylate, dipentaerythritol hexa(meth)acrylate, and compounds represented by the general formula (1):

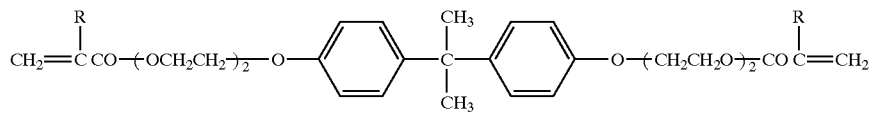

(wherein R is as defined in the first aspect).

Examples of the above epoxy-modified (meth)acrylate are not limited to but include bisphenol A epoxy-modified (meth)acrylate, glycerol diglycidyl ether-modified (meth) acrylate, neopentyl glycol diglycidyl ether-modified (meth) acrylate and ethylene glycol diglycidyl ether-modified (meth)acrylate.

As the above diluting monomer, there are, for example, 2-hydroxypropyl (meth)acrylate, dicyclopentenyloxyethyl (meth)acrylate, tetrahydrofurfuryl (meth)acrylate and isobornyl (meth)acrylate.

In order to control the viscosity, reactivity and hardness after curing of the photocurable compound, these are used together with the above reactive compound as needed.

In the second aspect of the present invention, the hydrophobic fine silica particle used as a matting agent is not particularly limited, and, for example, a hydrophilic fine silica particle which is hydrophobization-treated with a hydrophobic compound is used as in the first aspect. More particularly, there are a fine particle obtained by coating the surface of the hydrophilic fine silica particle with a hydrophobic compound, and a fine particle obtained by chemically binding a hydrophobic compound having hydrophobic groups in the molecule to silanol groups on the surface of the fine silica particle.

A method for hydrophobization-treating of a hydrophilic fine silica particle is not particularly limited, and methods known in the art may be performed, such as a method of immersing a hydrophilic fine silica particle into a solution of a hydrophobic compound, subsequently drying and heat-treating, and a method of spraying a solution of a hydrophobic compound while stirring powder of hydrophilic fine silica particles, followed by drying and heat-treating.

As the hydrophilic fine silica particle to be subjected to the hydrophobization-treatment, a conventional hydrophilic fine silica particle such as fused silica, white carbon obtained by a dry or wet process, and others can be used.

As the above hydrophobic compound, there are silicone compounds, silane compounds, metallic soap and wax, and, inter alia, silicone compounds and silane compounds are preferably used. As the silicone compound, there is, for example, silicone oil such as methyl hydrogen polysiloxane and modified dimethyl polysiloxanes in which amino groups or epoxy groups are introduced at their side chains or ends. As the silane compound, there are, for example, chlorosilane compounds such as methyl chlorosilane, phenyl chlorosilane and the like, alkoxysilane compounds such as methyl alkoxysilane, phenyl alkoxysilane, isobutyl alkoxysilane, hexyl alkoxysilane, octyl alkoxysilane, decyl alkoxysilane, dimethyl polysiloxy alkoxysilane and the like, silazane compounds such as hexamethyl disilazane and the like. Preferably, methyl hydrogen polysiloxane, modified dimetyl polysiloxane, hexyl alkoxysilane, dimethyl polysiloxy alkoxysilane and hexamethyl disilazane are used.

In the second aspect of the present invention, it is preferred that the M value possessed by the hydrophobic fine silica particle is 5 or more, more preferably 20 or more and, still more preferably 40 or more as in the first aspect. It is not preferable that the value is less than 5 because the degree of hydrophobicity of the fine silica particle is not sufficient, leading to poor alkali resistance.

The mean particle size of the hydrophobic fine silica particle used in the second aspect of the present invention, depending on the thickness of the coating to be coated on a glass container, is usually in the range of 0.1–25 μm, more preferably in the range of 1–5 μm from a viewpoint of manifesting fine frostiness. When the mean particle size of a fine silica particle is less than 0.1 μm, since inequalities of the surface (surface roughness) of the coating are so low that the coating becomes more transparent, it is difficult to manifest frostiness even if a large amount of fine silica particle is used. On the other hand, it is not preferable that the mean particle size is more than 25 μm, since inequalities of the surface (surface roughness) are conversely so high that the whiteness becomes high, the design is spoiled, and the surface is finished to feel rough.

In addition, in the second aspect of the present invention, as a polymer particle incorporated in order to improve impact resistance, for example, a fine acrylic particle such as a fine poly(meth)acrylic acid ester particle, a fine (meth) acrylic acid ester copolymer particle, a fine cross-linked poly(meth)acrylic acid ester particle, a fine cross-linked (meth)acrylic acid ester copolymer particle and the like, a fine silicone particle, a fine polystyrene particle, a fine cross-linked polystyrene particle, a fine polyamide particle, a fine polyurethane particle, a fine polyethylene particle, a fine polypropylene particle, a fine elastomer particle, a fine benzoguanamine particle, a fine urea resin particle, a fine phenolic resin particle can be utilized, being not limiting. Preferably, a fine acrylic particle such as a fine cross-linked poly(meth)acrylic acid ester particle, a fine cross-linked (meth)acrylic acid ester copolymer particle, a fine polyurethane particle and a fine silicone particle are used.

Although the mechanism by which the impact resistance is improved by the addition of these fine polymer particles is not clear, it is considered that the impact resistance of the coating is improved because the fine polymer particle is uniformly dispersed in the coating and it works as a focusing point of stress to relax internal stress at the time of curing and consequently, the adhesion of the coating is improved and, further, the particle also works as a focusing point of external stress exerted on the coating.

The mean particle size of the polymer particle used in the second aspect of the present invention, depending on the thickness of the coating on a glass container, is usually in the range of 0.1–25 $\mu$m, more preferably in the range of 1–10 $\mu$m from a viewpoint of improvement in the impact resistance and the appearance of the coating. When the mean particle size of the fine polymer particle is less than 0.1 $\mu$m, it is difficult to manifest the impact resistance. On the other hand, it is not preferable that the mean particle size is more than 25 $\mu$m, regardless of the improvement in impact resistance, since inequalities of the surface (surface roughness) of the coating become large, the surface is finished to feel rough.

Also in the frost-coating composition of the second aspect of the present invention, a fine particle other than a fine silica particle and a fine polymer particle may be used together in order to improve frostiness and feeling, and to prevent precipitation of the fine silica particle, as far as the alkali resistance is not adversely affected. As the fine particle other than a fine silica particle and a fine polymer particle, for example, a fine inorganic particle such as alumina, aluminium hydroxide, magnesium hydroxide, magnesium oxide, talc, mica and aluminosilicate, and a fine particle in which the surface of the above fine inorganic particle is hydrophobization-treated can be employed.

The frost-coating composition of the second aspect of the present invention is obtained by incorporating 5–50 parts by weight, preferably 10–30 parts by weight of the hydrophobic fine silica particle, and 3–30 parts by weight, preferably 5–15 parts by weight of the fine polymer particle based on 100 parts by weight of a photocurable compound. When the proportion of the hydrophobic fine silica particle is less than 5 parts by weight, it is difficult to manifest frostiness. In addition, it is not preferable that the proportion is more than 50 parts by weight because the whiteness is so high to spoil the design and the mechanical strength of the coating is deteriorated in some cases such that the coating becomes brittle. It is not preferable that the proportion of the fine polymer particle is less than 3 parts by weight, since the improving effect on impact resistance is low, and, on the other hand, when the proportion is more than 30 parts by weight, it is wasteful, furthermore, the properties of the coatings such as alkali resistance is adversely affected.

A hydrophobic fine silica particle and a fine polymer particle may be directly mixed into a photocurable compound to disperse, or they may be dispersed in a photocurable compound which is diluted in advance with an organic solvent such as toluene, xylene, isopropyl alcohol, butyl alcohol, ethyl acetate and ethyl methyl ketone (provided that the solvent does not dissolve the polymer particles). In addition, they may be mixed with a photocurable compound to disperse after they are dispersed in a diluting monomer or the above organic solvent. As a method for dispersing, methods known in the art can be used, such as a method of dispersing with a high-speed stirrer such as a disperser, a method of using a ball mill, a sand mill, or a bead medium mill, and a method of dispersing with an ultrasonic homogenizer or a homomixer having a high shearing force.

The frost-coating compositions of the first and second aspect of the present invention, which are obtained as described as above, can be coated on a glass container by the known method in the art, such as spraying and dipping. Thickness of the coating is usually in the range of 1–50 $\mu$m, preferably in the range of 3–25 $\mu$m in consideration of costs, properties of coatings and others.

A frosted glass container having excellent alkali resistance or further having excellent impact resistance can be obtained by curing a resin by irradiating a glass container coated with the frost-coating composition of the present invention with visible light or UV light using a xenon lamp, a low-, middle-, or high-pressure mercury-vapor lamp, a UV fluorescent lamp, a carbon arc lamp, a tungsten lamp and the like.

In the frost-coating compositions of the first and second aspect of the present invention, a polymerization initiator is usually used to initiate or promote polymerization. As the polymerization initiator, depending on the kinds of the photocurable compound used, both an ionic polymerization initiator and a radical polymerization initiator can be used. As the ionic polymerization initiator, there are, for example, aryl diazonium compounds, diaryl iodonium compounds, triaryl sulfonium compounds and triaryl serenonium compounds. As the radical polymerization initiator, there are, for example, benzoin, benzoin alkyl ethers, benzyl ketals, acetophenone, α-hydroxycyclohexyl phenyl ketone, acetophenone derivatives, benzil, benzophenone, benzophenone derivatives, α-acyloxime esters, thioxanthone derivatives, anthraquinone derivatives and aromatic peroxide esters. These are used alone or as a mixture of 2 or more of them. In addition, they may be used together with aromatic amines such as ethyl p-dimethylaminobenzoate and isoamyl p-dimethylaminobenzoate. The amount of the polymerization initiator to be used may be in the range of 0.1–20 parts by weight based on 100 parts by weight of a photocurable compound.

A coupling agent may be added, as needed, to the frost-coating compositions of the first and second aspect of the present invention in order to improve adhesion between the coating and the glass container and adhesive properties between the resin and the matting agent of hydrophobic fine silica particle. As the coupling agent, usually, a silane coupling agent is preferably used. As the above silane coupling agent, there are, for example, γ-acryloxypropyl trimethoxysilane, γ-acryloxypropyl methyl dimethoxysilane, γ-acryloxypropyl triethoxysilane, γ-methacryloxypropyl trimethoxysilane, γ-methacryloxypropyl triethoxysilane, γ-methacryloxypropyl methyl dimethoxysilane, vinyl trimethoxysilane and vinyl triethoxysilane.

Further, in order to impart the UV absorption effect to the coatings, a UV absorber may be added, as needed, to the frost-coating compositions of the first and the second aspect of the present invention.

It is preferred that the UV absorber is well miscible with resins, and may be appropriately selected from, for example, a benzophenone UV absorber such as 2-hydroxybenzophenone, 5-chloro-2-hydroxybenzophenone, 2,4-dihydroxybenzophenone, 2-hydroxy-4-methoxybenzophenone, 2-hydroxy-4-octyloxybenzophenone, 4-dodecyloxy-2-hydoroxybenzophenone, 2,2',4,4'-tetrahydroxybenzophenone and the like; a benzotriazol UV absorber such as 2-(2-hydroxy-5-methylphenyl)benzotriazol, 2-(2-hydroxy-3-t-butyl-5-methylphenyl)benzotriazol, 2-(2-hydroxy-3,5-di-tbutylphenyl)benzotriazol, 2-(2-hydroxy-5-t-octylphenyl)benzotriazol, 2-(2-hydroxy-3,5-di-t-amylphenyl)benzotirazol and the like; a benzoate UV absorber such as 2,4-di-t-butylphenyl-3,5-di-t-butyl-4-hydroxybenzoate and the like; a salicylic acid UV absorber; and a cyanoacrylate UV absorber.

A dispersing agent may be further added to the frost-coating compositions of the first and second aspect of the present invention in order to enhance the effect of dispersing the fine silica particle (in the second aspect, the fine silica particle and the fine polymer particle) in a resin. As the dispersing agent, there are a surfactant such as a nonionic surfactant, an anionic surfactant and a cationic surfactant, a reactive surfactant having (meth)acryloxy groups in the molecule, and a polymeric dispersing agent such as polycarbonic acid.

THE BEST MODE FOR CARRYING OUT THE INVENTION

The following Examples and Comparative Examples illustrate the present invention specifically, but the invention is not limited thereto.

effective component (solid content) was adjusted to 40% by weight. Twenty-five parts by weight of the above hydrophobic fine silica particles were uniformly dispersed in 250 parts by weight (in terms of solid content: 100 parts by weight) of the obtained solution of the photocurable compound by using an ultrasonic disperser. To this were added 8 parts by weight of α-hydroxycyclohexyl phenyl ketone (Trade name: Irgacure 184, manufactured by CIBA-GEIGY (Japan)) as a photopolymerization initiator and 4 parts by weight of γ-methacryloxypropyl trimethoxysilane (Trade name: KBM503, manufactured by Shin-Etsu Chemical) as a coupling agent to give the frost-coating composition of the first aspect of the present invention.

After a glass container washed with an aqueous alkali solution was dipped into the above composition, it was heated to dry at 80° C. for 90 seconds. Thickness of the obtained coating was 25 μm. Next, the coating was cured by irradiating UV light at an energy quantity of about 3,000mJ/cm$^2$ to obtain a frosted glass container.

Specular glossiness at 60° for the obtained glass container was measured according to JIS Z8741 Specular Glossiness Measuring Method, to assess frostiness. In addition, the alkali resistance was evaluated based on the state of peeling of the coating and the assessment of the frostiness after the obtained glass container was immersed into a 4% aqueous NaOH solution at 80° C. for 15 minutes, 30 minutes, or 60 minutes. The results are shown in Table 2. The glass container coated with the composition of the first aspect of the present invention showed neither whitening of the coating nor peeling of the coating from the container even after one-hour immersion, and the coating retained its fine frostiness and was excellent in alkali resistance.

TABLE 1

| COMPOUND | PART BY WEIGHT |
|---|---|
| 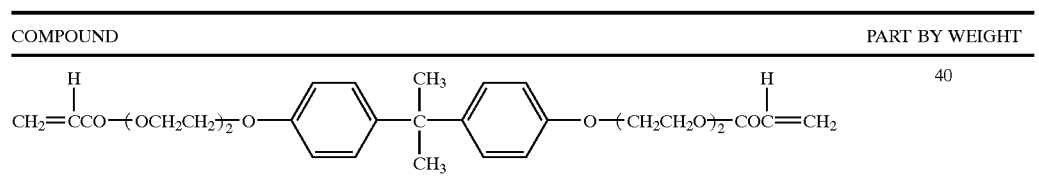 | 40 |
| 1,6-HEXANEDIOL DIACRYLATE | 15 |
| NEOPENTYL GLYCOL DIACRYLATE | 10 |
| TRIMETHYROLPROPANE TRIACRYLATE | 15 |
| DIPENTAERYTHRITOL HEXAACRYLATE | 15 |
| TETRAHYDROFURFURYL ACRYLATE | 5 |

EXAMPLE 1

A solution obtained by dissolving 2 parts by weight of methyl hydrogen polysiloxane (Trade name: Shin-Etsu silicone KF99, manufactured by Shin-Etsu Chemical) in 15 parts by weight of trichloroethylene was added to 100 parts by weight of hydrophilic fine silica particles (Trade name: Nipsil E200A, manufactured by Nippon Silica Industrial), which was stirred and mixed to adhere methyl hydrogen polysiloxane uniformly on the surface of the fine silica particles. After trichloroethylene was evaporated, heat-treatment at 150° C. for 2 hours afforded hydrophobic fine silica particles. The M value of the resulting hydrophobic fine silica particles was 75, and the mean particle size was 2.5 μm.

Then, the photocurable compound shown in Table 1 was dissolved in ethyl methyl ketone, and the proportion of the

EXAMPLE 2

A solution obtained by dissolving 2 parts by weight of epoxy-modified dimethylpolysiloxane (Trade name: Shin-Etsu silicone KF101, manufactured by Shin-Etsu Chemical) in 15 parts by weight of trichloroethylene was added to 100 parts by weight of hydrophilic fine silica particles (Trade name: Nipsil E200A, manufactured by Nippon Silica Industrial), which was stirred and mixed to adhere epoxy-modified dimethylpolysiloxane uniformly on the surfaces of the fine silica particles. After trichloroethylene was evaporated, heat-treatment at 150° C. for 2 hours afforded hydrophobic fine silica particles. The M value of the resulting hydrophobic fine silica particles was 55, and the mean particle size was 1.8 μm.

Then, 30 parts by weight of the above hydrophobic fine silica particles were uniformly dispersed in 250 parts by weight (in terms of solid content: 100 parts by weight) of a solution of the photocurable compound which had been prepared as in Example 1, by using an ultrasonic disperser. To this were added 5 parts by weight of benzyl dimethyl ketal as a photopolymerization initiator and 4 parts by weight of γ-acryloxypropyl trimethoxysilane (Trade name: KBM5103, manufactured by Shin-Etsu Chemical) as a coupling agent to give the frost-coating composition of the first aspect of the present invention.

A frosted glass container was obtained using the frost-coating composition as in Example 1, and the alkali resistance was evaluated. The results are shown in Table 2.

EXAMPLE 3

A solution obtained by dissolving 2 parts by weight of hexyl trimethoxysilane (Trade name: TSL 8241, manufactured by Toshiba Silicone) in 20 parts by weight of a mixed solution of ethanol/water was added to 100 parts by weight of hydrophilic fine silica particles (Trade name: Nipsil E200A, manufactured by Nippon Silica Industrial), which was stirred and mixed to adhere hexyl trimethoxysilane uniformly on the surfaces of the fine silica particles. After ethanol/water was evaporated, heat-treatment at 130° C. for 1 hour afforded hydrophobic fine silica particles. The M value of the resulting hydrophobic fine silica particles was 50, and the mean particle size was 2.5 μm.

Then, the frost-coating composition of the first aspect of the present invention was obtained as in Example 1.

A frosted glass container was obtained using the obtained frost-coating composition as in Example 1, and the alkali resistance was evaluated. The results are shown in Table 2.

EXAMPLE 4

The same procedures as those in Example 3 were performed except that hexamethyl disilazan (Trade name: SZ-6079, manufactured by Toray Dow Corning) was used instead of hexyl trimethoxysilane in Example 3, to give hydrophobic fine silica particles having the M value of 45 and the mean particle size of 2.0 μm.

Then, 30 parts by weight of the above hydrophobic fine silica particles were uniformly dispersed in 250 parts by weight of a solution of the photocurable compound which had been prepared as in Example 1 (containing 100 parts by weight of the photocurable compound), by using an ultrasonic disperser. To this were added 8 parts by weight of α-hydroxycyclohexyl phenyl ketone (Trade name: Irgacure 184, manufactured by CIBA-GEIGY (Japan)) as a photopolymerization initiator and 4 parts by weight of γ-methacryloxypropyl methyl dimethoxysilane (Trade name: KBM502, Shin-Etsu Chemical) as a coupling agent to give the frost-coating composition of the first aspect of the present invention.

A frosted glass container was obtained using the obtained frost-coating composition as in Example 1, and the alkali resistance was evaluated. The results are shown in Table 2.

EXAMPLE 5

The same procedures as those in Example 1 were performed except for using hydrophobic fine silica particles, the surfaces of which had been hydrophobization-treated with methyl hydrogen polysiloxane, having an M value of 20 and a mean particle size of 2.5 μm. The results are shown in Table 2.

EXAMPLE 6

The same procedures as those in Example 1 were performed except for using hydrophobic fine silica particles, the surfaces of which had been hydrophobization-treated with methyl hydrogen polysiloxane, having an M value of 10 and a mean particle size of 2.5 μm. The results are shown in Table 2.

Comparative Example 1

A frost-coating composition was obtained according to the same procedures as those in Example 1 except for using hydrophilic fine silica particles without hydrophobization-treatment, having a mean particle size of 2.5 μm (M value is zero). A frosted glass container was obtained by using the obtained frost-coating composition according to the same procedures as those in Example 1, and the alkali resistance was evaluated. The results are shown in Table 2. The obtained glass container showed gradual whitening of the coating immediately after the immersion and the coating was peeled from the glass container after 15 minutes.

TABLE 2

| | Hydrophobic Silica Particle | | Frostiness (Specular Glossiness at 60°) | | Peeling of Coating after Alkali Immersion | | |
|---|---|---|---|---|---|---|---|
| | Composition (part by weight) | M Value | Before alkali immersion | After 60 min. alkali immersion | 15 min. | 30 min. | 60 min. |
| Example 1 | 25 | 75 | 8.3 | 8.2 | No | No | No |
| Example 2 | 30 | 55 | 9.2 | 9.3 | No | No | No |
| Example 3 | 25 | 50 | 8.7 | 8.5 | No | No | No |
| Example 4 | 30 | 45 | 9.9 | 9.7 | No | No | No |
| Example 5 | 25 | 20 | 6.8 | 7.0 | No | No | No |
| Example 6 | 25 | 10 | 7.3 | 7.1 | No | No | Partly Yes |
| Comparative Example 1 | 25 (hydrophilic silica particle) | 0 | 8.2 | 2.8*[1] | Yes | Yes | Yes |

*[1]Data taken after 15 min. immersion in an alkali solution.

EXAMPLE 7

The photocurable compound shown in Table 1 was dissolved in ethyl methyl ketone, and the proportion of the effective component (solid content) was adjusted to 40% by weight. Twenty parts by weight of the hydrophobic fine silica particles obtained in Example 1, and 7 parts by weight of fine cross-linked polymethyl methacrylate particles (Trade name: MR2G, manufactured by Soken Kagaku, Mean particle size 2 μm) were uniformly dispersed in 250 parts by weight of the obtained solution of the photocurable compound (containing 100 parts by weight of the photocurable compound) by using an ultrasonic disperser. To this were added 8 parts by weight of α-hydroxycyclohexyl phenyl ketone (Trade name: Irgacure 184, manufactured by CIBA-GEIGY (Japan)) as a photopolymerization initiator and 4 parts by weight of γ-acryloxypropyl trimethoxysilane (Trade name: KBM5103, manufactured by Shin-Etsu Chemical) as a coupling agent to give the frost-coating composition in the second aspect of the present invention.

After the glass container washed with an aqueous alkali solution was dipped into the above composition, it was heated to dry at 80° C. for 90 seconds. Thickness of the obtained coating was 25 μm. Next, the coating was cured by irradiating UV light at an energy quantity of about 3,000 mJ/cm$^2$ to obtain a frosted glass container.

Specular glossiness at 60° for the obtained glass container was measured according to JIS Z8741 Specular Glossiness Measuring Method to assess frostiness. In addition, the alkali resistance was evaluated based on the state of peeling of the coating and the assessment of the frostiness after the obtained glass container was immersed into a 4% aqueous NaOH solution at 80° C. for 15 minutes, 30 minutes, or 60 minutes. Further, after immersing into a 4% aqueous NaOH solution at 80° C. for 5 minutes, a 15-minute scratching test with a line simulator manufactured by ARG (LS scratching test) was performed to examine cracking and peeling of the coating, thereby the impact resistance was evaluated. The results are shown in Table 3. The glass container coated with the frost-coating composition of the second aspect of the present invention showed neither whitening of the coating nor peeling of the coating from the container even after one-hour immersion, and the coating retained its fine frostiness and was excellent in alkali resistance. Further, neither cracking nor peeling of the coating occurred even after scratching for 15 minutes in the LS scratching test, thus, the impact resistance was also excellent.

EXAMPLE 8

Twenty parts by weight of the hydrophobic fine silica particles obtained in Example 1 and 12 parts by weight of fine acrylic acid ester copolymer particles (Trade name: Staphyroid AC3355, manufactured by Takeda Chemical Industries, Mean particle size 0.5 μm) were uniformly dispersed in 250 parts by weight of the solution of the photocurable compound, which was prepared as in Example 7 (containing 100 parts by weight of the photocurable compound), by using an ultrasonic disperser. To this were added 8 parts by weight of α-hydroxycyclohexyl phenyl ketone (Trade name: Irgacure 184, manufactured by CIBA-GEIGY (Japan)) as a photopolymerization initiator and 4 parts by weight of γ-acryloxypropyl trimethoxysilane (Trade name: KBM5103, manufactured by Shin-Etsu Chemical) as a coupling agent to give the frost-coating composition of the second aspect of the present invention.

A frosted glass container was obtained using the obtained frost-coating composition as in Example 7, and the alkali resistance and the impact resistance were evaluated. The results are shown in Table 3.

EXAMPLE 9

Twenty parts by weight of the hydrophobic fine silica particles obtained in Example 1 and 12 parts by weight of fine silicone particles (Trade name: Tospearl 130, manufactured by Toshiba Silicone, Mean particle size 3 μm) were uniformly dispersed in 250 parts by weight of the solution of the photocurable compound, which was prepared as in Example 7 (containing 100 parts by weight of the photocurable compound), by using an ultrasonic disperser. To this were added 8 parts by weight of α-hydroxycyclohexyl phenyl ketone (Trade name: Irgacure 184, manufactured by CIBA-GEIGY (Japan)) as a photopolymerization initiator and 4 parts by weight of γ-acryloxypropyl trimethoxysilane (Trade name: KBM5103, manufactured by Shin-Etsu Chemical) as a coupling agent to give the frost-coating composition of the second aspect of the present invention.

A frosted glass container was obtained using the obtained frost-coating composition as in Example 7, and the alkali resistance and the impact resistance were evaluated. The results are shown in Table 3.

EXAMPLE 10

Twenty parts by weight of the hydrophobic fine silica particles obtained in Example 1 and 20 parts by weight of fine polyurethane particles (Trade name: Artpearl, manufactured by Negami Kogyo, Mean particle size 7 μm) were uniformly dispersed in 250 parts by weight of the solution of the photocurable compound, which was prepared according to the same manner as that in Example 7 (containing 100 parts by weight of the photocurable compound), by using an ultrasonic disperser. To this were added 8 parts by weight of α-hydroxycyclohexyl phenyl ketone (Trade name: Irgacure 184, manufactured by CIBA-GEIGY (Japan)) as a photopolymerization initiator and 4 parts by weight of γ-acryloxypropyl trimethoxysilane (Trade name: KBM5103, manufactured by Shin-Etsu Chemical) as a coupling agent to give the frost-coating composition of the second aspect of the present invention.

A frosted glass container was obtained using the obtained frost-coating composition according to the same manner as that in Example 7, and the alkali resistance and the impact resistance were evaluated. The results are shown in Table 3.

TABLE 3

| | Hydrophobic Silica Particle | | Polymer Particle | | Frostiness (Specular Glossiness at 60°) | | Peeling of Coating | | | LS |
|---|---|---|---|---|---|---|---|---|---|---|
| | Composition | | | Composition | Before alkali | After 60 min. alkali | after Alkali Immersion | | | Scratching |
| | (part by weight) | M Value | Kind | (part by weight) | immersion | immersion | 15 min. | 30 min. | 60 min. | Test |
| Example 7 | 20 | 75 | Cross-linked Poly(methyl methacrylate) | 7 | 8.4 | 8.3 | No | No | No | No Peeling |

TABLE 3-continued

|  | Hydrophobic Silica Particle | | Polymer Particle | | Frostiness (Specular Glossiness at 60°) | | Peeling of Coating after Alkali Immersion | | | LS Scratching Test |
|---|---|---|---|---|---|---|---|---|---|---|
|  | Composition (part by weight) | M Value | Kind | Composition (part by weight) | Before alkali immersion | After 60 min. alkali immersion | 15 min. | 30 min. | 60 min. |  |
| Example 8 | 20 | 75 | Acrylic Acid Ester Copolymer | 12 | 9.0 | 9.1 | No | No | No | No Peeling |
| Example 9 | 20 | 75 | Silicone | 12 | 8.7 | 8.6 | No | No | No | No Peeling |
| Example 10 | 20 | 75 | Polyurethane | 20 | 9.1 | 8.9 | No | No | No | No Peeling |

Industrial Applicability

According to the present invention, a frosted coating having excellent alkali-washing resistance can be obtained by using, as a matting agent, a hydrophobic fine silica particle whose surface is hydrophobization-treated. Additionally, according to the present invention, a frosted coating having excellent alkali-washing resistance and excellent impact resistance can be obtained by using, as a matting agent, a hydrophobic fine silica particle whose surface is hydrophobization-treated and a polymer particle. Since the present invention is safer and more economically excellent in comparison with the conventional methods, it can be extensively and practically utilized for glass containers for alcoholic liquors, beverages and others.

What is claimed is:

1. A frost-coating composition comprising 5–50 parts by weight of a hydrophobic fine silica particle based on 100 parts by weight of a photocurable compound, such that said frost-coating composition forms a frosted coating having enhanced alkaline resistance.

2. A frost-coating composition comprising 5–50 parts by weight of a hydrophobic fine silica particle and 3–30 parts by weight of a fine polymer particle based on 100 parts by weight of a photocurable compound, such that said frost-coating composition forms a frosted coating having enhanced alkaline resistance.

3. The frost-coating composition according to claim 1 or 2, further comprising a small amount of a coupling agent.

4. The frost-coating composition according to claim 1 or 2, wherein the hydrophobic fine silica particle is obtained by hydrophobization-treating a hydrophilic fine silica particle with a hydrophobic compound.

5. The frost-coating composition according to claim 4, wherein the hydrophobic compound is a silicone compound or a silane compound.

6. The frost-coating composition according to claim 1 or 2, wherein the M value of the hydrophobic fine silica particle is 5 or more.

7. The frost-coating composition according to claim 1 or 2, wherein the mean particle size of the hydrophobic fine silica particle is 0.1–25 μm.

8. The frost-coating composition according to claim 2, wherein the fine polymer particle is at least one selected from the group consisting of a fine acrylic particle, a fine silicone particle, and a fine polyurethane particle.

9. The frost-coating composition according to claim 2, wherein the mean particle size of the fine polymer particle is 0.1–25 μm.

10. A frosted glass container obtained by coating and curing the frost-coating composition according to claim 1 or 2 or 8 or 9.

11. A frost-coating composition comprising 5–50 parts by weight of a hydrophobic fine silica particle based on 100 parts by weight of a photocurable compound, wherein the M value of the hydrophobic fine silica particle is 5 or more, such that said frost-coating composition forms a frosted coating having enhanced alkali resistance.

12. A frost-coating composition comprising 5–50 parts by weight of a hydrophobic fine silica particle and 3–30 parts by weight of a fine polymer particle based on 100 parts by weight of a photocurable compound, wherein the M value of the hydrophobic fine silica particle is 5 or more, such that said frost-coating composition forms a frosted coating having enhanced alkali resistance.

13. The frost-coating composition according to claim 11 or 12, wherein the photocurable compound contains at least one reactive compound selected from the group consisting of polyhydric (meth)acrylate, polyester (meth)acrylate, epoxy-modified (meth)acrylate and polyurethane (meth)acrylate.

14. The frost-coating composition according to claim 11 or 12, further comprising a small amount of a coupling agent.

15. The frost-coating composition according to claim 11 or 12, wherein the hydrophobic fine silica particle is obtained by hydrophobization-treating a hydrophilic fine silica particle with a hydrophobic compound.

16. The frost-coating composition according to claim 15, wherein the hydrophobic compound is a silicone compound or a silane compound.

17. The frost-coating composition according to claim 11 or 12, wherein the mean particle size of the hydrophobic fine silica particle is 0.1–25 μm.

18. The frost-coating composition according to claim 12, wherein the fine polymer particle is at least one selected from the group consisting of a fine acrylic particle, a fine silicone particle, and a fine polyurethane particle.

19. The frost-coating composition according to claim 12, wherein the mean particle size of the fine polymer particle is 0.1–25 μm.

20. A frosted glass container obtained by coating and curing the frost-coating composition according to claim 11 or 12 or 18 or 19.

21. A method to obtain a frost-coating, which comprises applying to a substrate a frost-coating composition comprising 5–50 parts by weight of hydrophobic fine silica particles based on 100 parts by weight of a compound which is photocurable to provide an enhanced alkaline resistive frost-coating.

22. A method to obtain a frosted glass container comprising the steps of:
preparing a frost-coating composition which comprises 5–50 parts by weight of a hydrophobic fine silica particle based on 100 parts by weight of a photocurable compound,
coating the frost-coating composition on a glass container,
curing a photocurable compound by irradiating the glass container coated with the frost-coating composition with an active energy ray, whereby said frost-coating composition forms a frosted coating having enhanced alkaline resistance.

* * * * *

UNITED STATES PATENT AND TRADEMARK OFFICE
CERTIFICATE OF CORRECTION

PATENT NO.    : 6,476,093 B1
DATED         : November 5, 2002
INVENTOR(S)   : Araki et al.

It is certified that error appears in the above-identified patent and that said Letters Patent is hereby corrected as shown below:

<u>Title page,</u>
Item [73], Assignee, change "Sumitomo Seiki Chemicals Co., Ltd." to
-- Sumitomo Seika Chemicals Co., LTD. --

Signed and Sealed this

Fifteenth Day of April, 2003

JAMES E. ROGAN
*Director of the United States Patent and Trademark Office*